United States Patent

Turowski-Wanke et al.

[11] Patent Number: 6,066,753
[45] Date of Patent: May 23, 2000

[54] MIXTURES OF LONG-CHAIN ALKYL PHOSPHATES

[75] Inventors: Angelika Turowski-Wanke, Kelkheim; Matthias Löffler, Niedernhausen; Oliver Eyrisch, Essen, all of Germany

[73] Assignee: Clariant GmbH, Frankfurt, Germany

[21] Appl. No.: 09/151,865

[22] Filed: Sep. 11, 1998

[30] Foreign Application Priority Data

Sep. 12, 1997 [DE] Germany ............ 197 40 069

[51] Int. Cl.$^7$ .............. C09F 9/02; C09F 9/09; C09F 9/11; A61K 7/06; A61K 7/48; B01F 17/14
[52] U.S. Cl. ............ 558/208; 516/56; 516/145; 516/199; 516/DIG. 1
[58] Field of Search ............ 558/208; 516/145; 516/56, DIG. 1, 199

[56] References Cited

U.S. PATENT DOCUMENTS

| | | | |
|---|---|---|---|
| 2,005,619 | 6/1935 | Graves | 558/208 X |
| 2,200,295 | 5/1940 | Robinson | 558/208 X |
| 2,272,847 | 2/1942 | Macht | 558/208 X |
| 2,529,303 | 11/1950 | McDermott | 558/208 X |
| 2,642,452 | 6/1953 | Mikeska et al. | 558/208 |
| 2,872,351 | 2/1959 | Wedell | 558/208 X |
| 3,012,055 | 12/1961 | Pollitzer | 558/208 |
| 3,012,056 | 12/1961 | Cyba | 558/208 |
| 3,107,262 | 10/1963 | Rochen | 558/208 |
| 3,384,466 | 5/1968 | Popkin | 558/208 X |
| 3,428,713 | 2/1969 | Bartlett et al. | 558/208 |
| 3,702,757 | 11/1972 | Mehmedbasich et al. | 558/208 X |
| 4,025,583 | 5/1977 | Mead et al. | 558/208 X |
| 4,152,421 | 5/1979 | Tsutsumi et al. | 424/57 |
| 4,191,666 | 3/1980 | Chabert et al. | 252/545 |
| 4,289,634 | 9/1981 | Lewis et al. | 252/32.5 |
| 4,530,802 | 7/1985 | Sung et al. | 558/208 |
| 5,245,070 | 9/1993 | Nishikawa et al. | 558/208 |
| 5,494,938 | 2/1996 | Kawa et al. | 514/786 |

FOREIGN PATENT DOCUMENTS

| | | |
|---|---|---|
| 0201040 | 11/1986 | European Pat. Off. . |
| 0227012 | 7/1987 | European Pat. Off. . |
| 0265702 | 5/1988 | European Pat. Off. . |
| 0553241 | 8/1993 | European Pat. Off. . |
| 2297668 | 8/1976 | France . |
| 58-180496 | 10/1983 | Japan .............. 558/208 |
| 2139112 | 5/1984 | United Kingdom . |
| WO 92/07543 | 5/1992 | WIPO . |

OTHER PUBLICATIONS

European Search Report.
Derwent Patent Family Report and/or Abstract.

*Primary Examiner*—Floyd D. Higel
*Attorney, Agent, or Firm*—Miles B. Dearth

[57] ABSTRACT

The invention relates to mixtures of long-chain alkyl phosphates of the formula

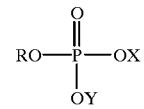

in which R is a mixture of $C_{12}$–$C_{22}$, preferably $C_{14}$–$C_{20}$, straight-chain alkyl radicals and $C_{12}$–$C_{22}$, preferably $C_{14}$–$C_{20}$, β-branched alkyl radicals, and X and Y are identical or different and are hydrogen, alkali metal or an equivalent of an alkaline earth metal, ammonium, mono-, di- or tri-alkylammonium or an organic base, or X and/or Y are as defined under R. These esters are suitable as emulsifiers, in particular for oil-in-water emulsions of a cosmetic pharmaceutical nature.

6 Claims, No Drawings

MIXTURES OF LONG-CHAIN ALKYL PHOSPHATES

BACKGROUND OF THE INVENTION

The invention relates to mixtures of long-chain alkyl phosphates and to their use as emulsifier, in particular in cosmetic and pharmaceutical emulsions. These esters are notable for being very effective in lowering surface tension, for having high stability, even upon heating, and low sensitivity to electrolytes and acids.

The use of emulsifiers for the preparation of creams, lotions, ointments etc., which comprise two or more immiscible substances (e.g. water, oil, organic and inorganic constituents), has been known for a long time. The emulsifiers used are surfactants, e.g. soaps of alkali metals and alkanolamines, mono- and diglyceryl esters of fatty acids, but also certain naturally occurring substances (e.g. lecithins, waxes) and inorganic substances (e.g. bentonite).

EP-B-0 553 241 discloses the use of mixtures of alkyloligoglucosides, fatty alcohols and, if desired, polyglucose for the preparation of emulsions. WO-92/07543 describes the use of alkyloligoglucosides with fatty alcohols and partial glycerides as cosmetic emulsifiers.

EP-B-0 201 040 describes the emulsifying power of metal salts of dialkyl phosphates, and EP-B-0 227 012 that of monoalkyl phosphates. GB-A-2 139 112 describes an emulsifier mixture consisting of mono- and diphosphate, some of which are also ethoxylated, in a ratio of from 100:0 to 70:30 and also a nonionic surfactant.

The use of β-branched monoalkyl phosphates as emulsifier is described in EP-A-0 265 702.

German Patent Application 197 07 800.1 likewise describes mixtures of mono-, di- and trialkyl phosphates and their use as emulsifiers.

SUMMARY OF THE INVENTION

All of these prior art phosphates are products derived either from a linear fatty alcohol or from a β-branched fatty alcohol. In contrast to this, the present invention relates to alkyl phosphates in which the alkyl group is a mixture of linear and β-branched alkyl groups.

DESCRIPTION OF THE PREFERRED EMBODIMENTS

The invention provides mixtures of long-chain alkyl phosphates of the formula

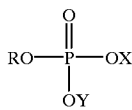

in which R is a mixture of $C_{12}$–$C_{22}$, preferably $C_{14}$–$C_{20}$, straight-chain alkyl radicals and $C_{12}$–$C_{22}$, preferably $C_{14}$–$C_{20}$, β-branched alkyl radicals, and X and Y are identical or different and are hydrogen, alkali metal or an equivalent of an alkaline earth metal, ammonium, mono-, di- or tri-alkylammonium or an organic base, or X and/or Y are as defined under R.

Organic bases in the definition of X and Y are preferably basic amino acids, such as, for example, arginine, ornithine, lysine, and alkanolamines, such as mono- or triethanolamine. X and/or Y can have the same meaning as R. In these cases, the compounds are di- or triphosphates. The claimed alkyl phosphates can be in the form of pure mono-, di- or trialkyl esters, preference is given to mixtures of mono-, di- and trialkyl esters in the mixing ratio 30–60, 30–60 and 0–10% by weight for the mono-, di- and triesters. Particular preference is given to mixing ratios of 30–50, 40–60 and 0–2% by weight. Normally, the proportion of mono- and diesters is approximately equal.

The radical R in the alkyl phosphates according to the invention is a mixture of straight-chain and β-branched alkyl radicals. The proportion of the linear alkyl radical is more than 0% by weight, preferably from 0.1 to 99% by weight, in particular from 0.1 to 5% by weight. The remainder is β-branched alkyl.

The alkyl phosphates according to the invention are prepared by processes known per se by reaction of tetraphosphorus decaoxide and a mixture of straight-chain and β-branched $C_{12}$–$C_{22}$-fatty alcohols in the mixing ratio given above. The straight-chain fatty alcohols are preferably mixtures of fatty alcohols which are derived from native fatty acids and are accordingly mixtures of varying chain length and, in addition, also comprise greater or lesser amounts of unsaturated fatty alcohols. The β-branched fatty alcohols are Guerbet alcohols, which are obtainable by the Guerbet-synthesis (Ullmann's Encyclopedia of Industrial Chemistry, 5th Edition, Vol A 10, p. 288). The phosphate synthesis produces a mixture of mono-, di- and triesters with a content of about 2% by weight of triester. The remainder consists of approximately equal parts of mono- and diesters.

The phosphate mixtures according to the invention are generally suitable for the preparation of surfactant-containing formulations, in which the phosphate is the surfactant. Moreover, these phosphate mixtures are also suitable as emulsifier for aqueous emulsions of the oil-in-water or water-in-oil type, for example emulsions of a cosmetic or pharmaceutical nature, preferably also for the preparation of alcohol-free emulsions. These emulsions comprise the phosphate mixtures according to the invention in amounts of from 0.1 to 5% by weight, preferably from 0.3 to 3% by weight.

The performance of an emulsifier is correlated with the reduction in surface tension. Phosphates having the composition described above are notable for their surface tension-lowering effect. Surprisingly, it has been found that the phosphate mixtures according to the invention drastically reduce surface tension, which the performance as an emulsifier reflects.

TABLE 1

Surface tension behavior of a variety of phosphates toward oils of varying polarity

| Phosphate | Paraffin oil | Cetearyl isononanoate | Soybean oil |
|---|---|---|---|
| Lauryl | 28 | 16.5 | 16 |
| Stearyl | 16 | 15.8 | 15.5 |
| Isostearyl | 11 | 8.5 | 9.0 |
| Isooctadecyl | 1.5 | 2.5 | 3.0 |
| Oleyl | 13 | 11 | 9.0 |
| Behenyl | 36 | 24 | 17.5 |
| Octyldecyl* | 1.3 | 2.3 | 2.8 |

Surface tension in mN/m

Temperature 25° C., concentration 1.5 g of phosphate in 1 liter of water, pH 7, Na salt.

The surface tension was determined using a Lauda drop volume tensiometer.

Octyldecyl refers to a mixture of 98.5% by weight of a β-branded $C_{18}$-fatty alkyl and 1.5% by weight of a linear $C_{18}$- fatty alkyl.

The term "phosphate" in this table means a mixture of approximately equal parts of mono- and diesters and also a small amount of triesters.

Comparative studies of the emulsifying power of the octyldecyl phosphate according to the invention with stearyl phosphate in parrafin oil and soybean oil as a function of the emulsifier concentration confirm the high efficiency in the lowering of surface tension (Table 2).

TABLE 2

| Emulsifier in oil | Conc. (g/l) | Surface tension (mN/m) |
|---|---|---|
| Stearyl phosphate in paraffin oil | 0.5 | 22.0 |
| | 1.0 | 17.0 |
| | 2.2 | 16.0 |
| | 5.0 | 17.5 |
| Stearyl phosphate in soybean oil | 0.5 | 13.0 |
| | 1.0 | 12.5 |
| | 2.2 | 12.0 |
| | 5.0 | 11.5 |
| Octyldecyl phosphate in paraffin oil | 0.5 | 17.0 |
| | 1.0 | 11.0 |
| | 2.2 | 1.7 |
| | 5.0 | 1.6 |
| Octyldecyl phosphate in soybean oil | 0.5 | 2.8 |
| | 1.0 | 3.3 |
| | 2.2 | 3.6 |
| | 5.0 | 3.8 |

Stability tests with a variety of oils, such as squalane, soybean oil, cetearyl isononanoate and isopropyl palmitate, showed that emulsions which comprise the octyldecyl phosphate according to the invention as emulsifier show no cracking whatsoever in the 90-day storage test at 40, 45 and 50° C. Comparable results were obtained in the centrifuge test at different emulsifier concentrations. The emulsifiers according to the invention are notable for being very effective in lowering the surface tension, even at high temperatures, of polar and nonpolar constituents. The emulsifiers, some of which are liquid, have improved stability to electrolyte additives and acids and a long shelf life. They have a pH in the range from 5 to 7 and can thus be used as emulsifiers which are very gentle on the skin, both in oil-in-water and water-in-oil emulsions, preferably in skincare compositions.

The nonaqueous part of the emulsions, which largely comprises the emulsifier and oily substance, is usually from 5 to 95% by weight and preferably from 15 to 75% by weight. This means that the emulsions may contain from 5 to 95% by weight, and preferably from 25 to 85% by weight, of water, depending on whether the intention is to prepare lotions having a comparatively low viscosity, or creams and ointments having a high viscosity.

Examples of suitable oily substances are Guerbet alcohols based on fatty alcohols having from 6 to 18, preferably from 8 to 10, carbon atoms, esters of linear $C_6$–$C_{13}$-fatty acids with linear $C_6$–$C_{20}$-fatty alcohols, esters of branched $C_6$–$C_{13}$-carboxylic acids with linear $C_6$–$C_{20}$-fatty alcohols, esters of linear $C_6$–$C_{18}$-fatty acids with branched alcohols, in particular 2-ethylhexanol, esters of linear and/or branched fatty acids with polyhydric alcohols (such as, for example, dimerdiol or trimerdiol) and/or Guerbet alcohols, triglycerides based on $C_6$–$C_{10}$-fatty acids, vegetable oils, branched primary alcohols, substituted cyclohexanes, Guerbet carbonates, dialkyl ethers and/or aliphatic or aromatic hydrocarbons. The proportion of oily substances in the nonaqueous part of the emulsions can be from 5 to 95% by weight and, preferably, from 15 to 75% by weight.

The emulsions can be used as skincare compositions, such as, for example, day creams, night creams, beauty creams, nourishing creams, body lotions, ointments and the like, and may comprise as further auxiliaries and additives, coemulsifiers, superfatting agents, fats, waxes, stabilizers, biogenic active substances, glycerol, preservatives, dyes and perfumes.

It is essential to the invention that the described mixtures of phosphates can also be used without co-use of a nonionic surfactant as coemulsifier. The co-use of coemulsifiers is thus not imperative, but possible.

Suitable nonionogenic O/W coemulsifiers are the products of the addition reaction of from 2 to 30 mol of ethylene oxide and/or from 0 to 5 mol of propylene oxide with linear fatty alcohols having from 8 to 22 carbon atoms, with fatty acids having from 12 to 22 carbon atoms and with alkylphenols having from 8 to 15 carbon atoms in the alkyl group; $C_{12}$–$C_{18}$-fatty acid mono- and diesters of the products of the addition reaction of from 1 to 30 mol of ethylene oxide with glycerol; glyceryl mono- and diesters and sorbitan mono- and diesters of saturated and unsaturated fatty acids having from 6 to 22 carbon atoms and the products of their addition reaction with ethylene oxide; products of the addition reaction of from 15 to 60 mol of ethylene oxide with castor oil and/or hydrogenated castor oil; polyol and, in particular, polyglyceryl esters, such as, for example, polyglyceryl polyricinoleate and polyglyceryl poly-12-hydroxystearate. Mixtures of compounds from two or more of these classes of substance are also suitable. The products of the addition reaction of ethylene oxide and/or propylene oxide with fatty alcohols, fatty acids, alkylphenols, glyceryl mono- and diesters and also sorbitan mono- and diesters of fatty acids, or with castor oil are known products which are available commercially. They are homolog mixtures whose average degree of alkoxylation corresponds to the ratio of the amounts of ethylene oxide and/or propylene oxide and substrate used in the addition reaction. $C_{12}$–$C_{18}$-fatty acid mono- and diesters of products of the addition reaction of ethylene oxide with glycerol are known from DE-20 24 051 as superfatting agents for cosmetic preparations.

Superfatting agents which can be used are substances such as, for example, polyethoxylated lanolin derivatives, lecithin derivatives, polyol fatty acid esters, monoglycerides and fatty acid alkanolamides, the latter also being used as foam stabilizers. Typical examples of fats are glycerides, and suitable waxes are, inter alia, beeswax, paraffin wax or microwaxes, if desired in combination with hydrophilic waxes, e.g. cetyl stearyl alcohol. Stabilizers which may be used are metal salts of fatty acids, such as, for example, magnesium stearate, aluminum stearate and/or zinc stearate. Biogenic active substances are taken to mean, for example, plant extracts and vitamin complexes. Examples of suitable preservatives are phenoxyethanol, formaldehyde solution, parabens, pentanediol and sorbic acid. Examples of suitable pearlizing agents are glycol distearates, such as ethylene glycol distearate, but also fatty acid monoglycol esters. The dyes which can be used are the substances which are approved and suitable for cosmetic purposes, such as are listed, for example, in the publication "Kosmetische Färbemittel" [Cosmetic Colorants] from the Farbstoffkommission der Deutschen Forschungsgemeinschaft [Dyes Commission of the German Research Society], Verlag Chemie, Weinheim, 1984, pp. 81–106.

The total amount of auxiliaries and additives can be from 1 to 10% by weight, preferably from 2 to 5% by weight, based on the composition. The compositions can be prepared in a manner known per se, i.e. for example by hot, hot-hotcold or PIT emulsification.

Examples

I. O/W Skin milk
Composition

| | | |
|---|---|---|
| A | Octyldecyl phosphate | 1.50% |
| | (novel mixture of $C_{18}$-alkly phosphates having a content of approximately 1.5% of linear alkyl) | |
| | Paraffin oil, low-viscosity | 5.00% |
| | ® Miglyol 812 (Dynamit Nobel) | 4.00% |
| | Caprylic/capric triglycerides | |
| | Isopropyl palmitate | 6.00% |
| | Jojoba oil | 2.00% |
| | Soybean oil | 3.00% |
| B | ® Carbopol 980 (Goodrich) | 0.50% |
| C | ® Aquamollin BC Powder, high-conc. (Clariant GmbH) | 0.10% |
| | Citric acid (10%) | 0.30% |
| | NaOH (10%) | 3.20% |
| | Glycerol | 3.00% |
| | Water | 71.0% |
| | Preservative | q.s. |
| D | Perfume oil | 0.30% |

Preparation

I  Add B to A, then stir in C and mix well
II  Stir D into I
III  Finally, homogenize the emulsion

II. O/W Cream
Composition

| | | |
|---|---|---|
| A | Octyldecyl phosphate (as in Example I) | 1.00% |
| | ® Hostacerin DGMS (Clariant GmbH) | 2.50% |
| | Polyglycerol-2 stearate | |
| | ® Miglyol 812 (Dynamit Nobel) | 3.00% |
| | Caprylic/capric triglyerides | |
| | ® Cetiol SN (Henkel KGaA) | 4.00% |
| | Cetearyl isononanoate | |
| | Isopropyl palmitate | 5.00% |
| | Wheat germ oil | 1.00% |
| | Jojoba oil | 3.00% |
| | Soybean oil | 4.00% |
| B | ® Carbopol 980 (Goodrich) | 0.60% |
| C | ® Hostapon KCG (Clariant GmbH) | 0.60% |
| | Sodium cocoyl glutamate | |
| | Aquamollin BC Powder, high-conc. (Clariant GmbH) | 0.10% |
| | Citric acid (10%) | 0.30% |
| | NaOH (10%) | 2.90% |
| | Glycerol | 3.00% |
| | Water | 68.60% |
| | Preservative | q.s. |
| D | Perfume oil | 0.40% |

Preparation

I  Melt A at about 80° C., then add B
II  Heat C to about 80° C.
III  Add II to I with stirring and stir while cold
IV  Stir in III at about 35° C.
V  Finally, homogenize the emulsion

III. O/W skin milk
Composition

| | | |
|---|---|---|
| A | Octyldecyl phosphate (as in Example I) | 1.50% |
| | Hostacerin DGI (Clariant GmbH) | 2.00% |
| | Paraffin oil, low-viscosity | 8.00% |
| | Isopropyl palmitate | 6.00% |
| | Cetiol 868 (Henkel KGaA) | 5.00% |

-continued

| | | |
|---|---|---|
| B | ® Carbopol 980 (Goodrich) | 0.40% |
| C | Water | 75.20% |
| | Sodium hydroxide (10%) | 1.60% |
| | Preservative | q.s. |
| D | Perfume oil | 0.30% |

Preparation

I  Add B to A, then stir in C and mix well
II  Stir D into I
III  Finally, homogenize the emulsion Chemical names for the trade names
Carbopol 980: Acrylic acid polymers
Miglyol 812: Caprylic/capric triglycerides
Aquamolin BC powder, high-conc.: Sodium ethylenediamine tetra-acetate
Hostacerin DGMS: Polyglyceryl-2 stearate
Cetiol SN: Ceteayl isononanoate
Cetiol 868: isooctyl stearate
Hostapon KCG: Sodium cocoyl glutamate
Hostacerin DGI: Polyglyceryl-2 sesquiisostearate

What is claimed is:

1. A mixture of long-chain alkyl phosphates of the formula

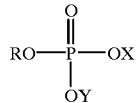

in which R is a mixture of from 0.1 to 5% by weight of $C_{12}$–$C_{22}$ straight chain alkyl radicals and from 99.9 to 95% by weight of $C_{12}$–$C_{22}$ β-branched alkyl radicals, and X and Y are identical or different and are selected from the group consisting of hydrogen, alkali metal or alkaline earth metal, ammonium, mono-, di, or tri-alkylammonium, an organic base, $C_{12}$–$C_{22}$ straight chain alkyl radicals, and $C_{12}$–$C_{22}$ β-branched alkyl radicals.

2. The mixture of long chain alkyl phosphates as claimed in claim 1, wherein said straight chain alkyl radical R is $C_{14}$–$C_{20}$-alkyl.

3. The mixture of long-chain alkyl phosphates as claimed in claim 1, which comprises 30–60% by weight of monoesters, 30–60% of diesters and 0–10% by weight of triesters.

4. A surfactant-containing formulation comprising a mixture of long-chain alkyl phosphates as claimed in claim 1.

5. An aqueous emulsion comprising a mixture of long-chain alkyl phosphates as claimed in 1.

6. An aqueous emulsion comprising from 0.1 to 5% by weight of a mixture of long-chain alkyl phosphates as claimed in claim 1.

* * * * *